Sept. 8, 1970  F. C. GENOVESE  3,526,949
FLY'S EYE MOLDING TECHNIQUE
Filed Oct. 9, 1967
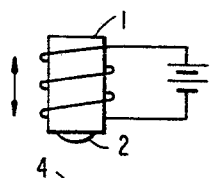
FIG.1
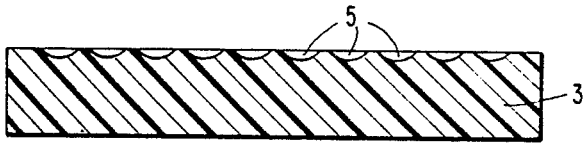
FIG.2
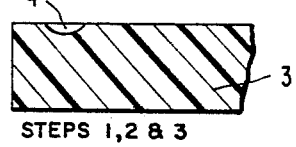
STEPS 1, 2 & 3
FIG.3
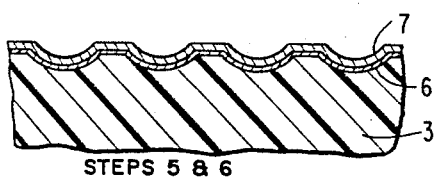
STEPS 5 & 6
FIG.4
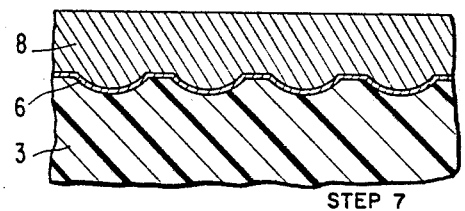
STEP 7
FIG.5
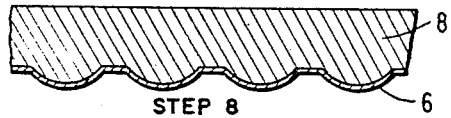
STEP 8
FIG.6
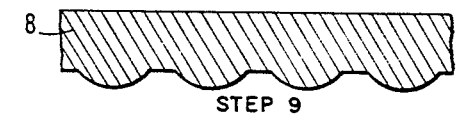
STEP 9
FIG.7
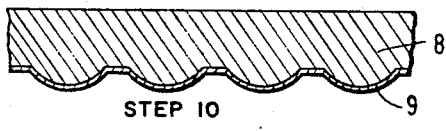
STEP 10
FIG.8
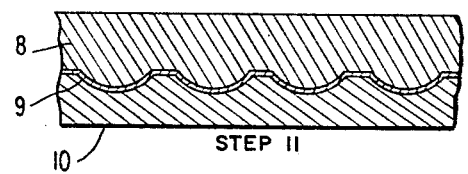
STEP 11
FIG.9
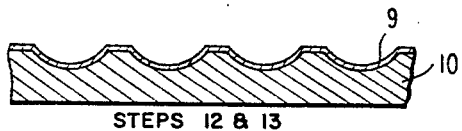
STEPS 12 & 13
INVENTOR
FRANK C. GENOVESE
BY
ATTORNEYS

United States Patent Office 3,526,949
Patented Sept. 8, 1970

3,526,949
FLY'S EYE MOLDING TECHNIQUE
Frank C. Genovese, Yonkers, N.Y., assignor to International Business Machines Corporation, Armonk, N.Y., a corporation of New York
Filed Oct. 9, 1967, Ser. No. 673,769
Int. Cl. B21d 32/16; B23k 31/00; B23p 3/02
U.S. Cl. 29—424
8 Claims

ABSTRACT OF THE DISCLOSURE

A method of forming a fly's eye lens mold comprising the formation of a detent in a thermoplastic material with a heated tool, allowing the tool to cool in place before removing and repeating the step at an adjacent area to form a detent array, forming a metal mold replica and finally a positive metal mold using conventional electroplating techniques.

BACKGROUND OF THE INVENTION

The present invention relates to a method of constructing a fly's eye lens mold.

The manufacture of integrated circuits involves the formation of both active and passive circuit components in a single piece of wafer material which may only be as large as one inch in diameter. Each wafer may have thereon as many as 1,000 identical units, with each unit being formed simultaneously by microphotographic process using a fly's eye system. This particular system uses a multilens technique and derives its name from the simularity between a fly's eye and the structure of the composite lens used in the system.

In the multilens system, a plurality of identical lenses are formed in a plane, the number of lenses corresponding to the number of desired images, so that each lens will produce a reduced identical image of a single object in the same focal plane.

Conventional technology for producing the lens is to put a single metal ball in a retainer that is associated with a manually operated punch mechanism. As shown in U.S. Pat. 3,288,045 to W. E. Harding, assigned to the present assignee, a metal block, usually copper, is positioned in a desired location and a depression is made by force-pressing the ball the desired depth in a mold. The mold is moved to a new location after forming each cell and the punch mechanism is again actuated at the new location in a step-by-step manner, until the desired cell array is formed in the copper block.

Another method used heretofore in making a lens mold calls for the formation of a nest of chrome alloy balls in a desired array and then pressing the ball array simultaneously into a copper block to form the copper mold.

The chief distinction of present techniques is the use of a thermoplastic material as a mold medium instead of the metallic material used in the past. As will hereinafter be described in detail, the lens forming tool is heated and then indented in the thermoplastic mold. The thermoplastic mold is allowed to cool with the tool in place. This technique ensures exact conformity of the thermoplastic with the shape of the hot tool. The tool is removed, reheated and then the process is repeated in a step and repeat manner to form an array. The result is a negative form of a fly's eye lens which has been constructed of thermoplastic material and which is free of local distortions.

The present invention has the additional advantages of reducing Brinelling, allows deeper indents, better control of the indenting depth and extends the life of the punching tool.

SUMMARY

This invention defines a method of making a fly's eye lens mold wherein a heated tool is indented in a thermoplastic block and allowed to cool in place. After cooling, the tool is removed leaving a lens replica in the block. The process is similarly repeated until a composite array is formed in the block. A metal replica of the lens array is formed by depositing a metal on the plastic block. The thermoplastic material is then stripped away from the metal replica and a positive metal mold is formed by depositing a metal over the replica. Finally, the metal replica is stripped away leaving the positive metal mold.

This invention consists of a series of steps constituting a method of producing a fly's eye lens mold. The foregoing and other objects, features and advantages of the invention will be apparent from the following more particular description of preferred embodiments of the invention, as illustrated in the accompanying drawings.

In the drawings:

FIG. 1 illustrates a heatable tool and its associated lens replica used to form an indentation in a thermoplastic block.

FIG. 2 illustrates a thermoplastic block having a cell array formed therein.

FIG. 3 shows the thermoplastic block with a release agent deposited thereon.

FIG. 4 shows heavy copperplating over the release agent of FIG. 3.

FIG. 5 illustrates the metal replica with the plastic block stripped away.

FIG. 6 illustrates the metal replica after a selective etching away of the release agent.

FIG. 7 shows the metal replica with the release agent reapplied.

FIG. 8 illustrate a positive metal mold which is plated over the release agent.

FIG. 9 illustrates the resulting positive copper mold after it has been separated from the metal replica of FIG. 8.

According to the present invention, a suitable tool element 1, capable of being heated as shown in FIG. 1, is made of metal or any fragile material, such as glass, capable of withstanding the rather small forces involved and is provided with at least one lens replica 2 thereon. The lens replica 2 is elliptically or spherically shaped depending upon the form of the lens desired. The tool 1 may be provided with the entire lens array thereon. It has been found, however, that because of the extremely close tolerances between the individual lenses of the array, it is very difficult to align the several lens replicas on the tool so that the proper array is formed when indented in the plastic block.

The tool 1 is first heated and then mechanically forced by any suitable means into a thermoplastic material 3, forming an indentation 4, therein as shown in FIG. 1. The tool is allowed to cool in place. It is extremely important that the tool not be removed while still in a heated condition, since the thermoplastic material possesses a memory which will cause it to flow back toward its original position before the tool was embedded therein if the plastic material in the area of the indentation has not properly set. Formation of the indentation in this manner in the plastic will present a continuous surface free of cracks and burrs which might later be transferred to the lens mold, causing distortions therein.

After the tool has sufficiently cooled, it is removed from the thermoplastic material leaving the indentation 4, and the process is repeated in a step and repeat manner until the desired lens array 5 illustrated by FIG. 2 is achieved. Once the array has been formed, the block is placed in an evaporating apparatus (not shown) where a thin layer of chrome 6 is deposited over the indented array of the plastic block. Subsequently, a second thin layer of copper 7 is deposited over the chrome layer, as diagrammatically illustrated in FIG. 3. It has been found that the chrome will adhere well to the plastic, but the copper does not plate easily on a pure chrome surface. It is only necessary, however, that the copper layer remain in place long enough to allow initial copper-plating to take place in a subsequent plating step.

Following the application of the chrome and copper layers, a second layer 8 of copper is built up to thickness of from 3/8" to 1/2" on the initial copper layer 7 using standard electroplating techniques by immersing the plastic block in an acid-copper bath (not shown) forming a rigid metal replica of the indented thermoplastic surface, as illustrated in FIG. 4. Copper is chosen in this instance to form the metal replica because of its low stress characteristics and inherent hardness. Aluminum in an ether bath could be substituted for the copper in an electroplating step if it is desirable to have a metal replica displaying extremely low stress characteristics. However, the aluminum does not posses the hardness of copper and for this reason, copper is preferred.

Once the copper replica 8 has been formed, substantially all of the indented plastic material 3 is stripped away from the metal by a rough machining process. The remaining plastic material is then cleaved or dissolved away leaving the chrome face 6 exposed, as illustrated in FIG. 5. The chrome is then removed, as shown in FIG. 6, from the copperplating by a selective etching process using standard etching techniques such as those disclosed in the patent to Harding, 3,288,045, issued Nov. 29, 1966. In such a manner, residual material is removed and a smooth, clean copper surface is presented. If the surface irregularities are permitted to remain, defects will later occur in the metal lens mold.

Referring to FIG. 7, the copper replica 8 which, in this instance, is a negative of the mold to be ultimately formed, is cleaned using any suitable cleaning agent and then replaced in a vacuum apparatus where an interlaced chrome-copper release agent 9 is plated by an conventional evaporation process on the replica 8 according to rigid dimension specifications corresponding to the desired array in preparation for a formattion of a positive metal mold to be built up on the replica. Following the deposition of the thin layer of chrome-copper release agent 9, the mold is removed from the evaporation apparatus and subjected to a copper electroplating bath to build up a copper backing. The copper backup is plated to the thickness of 3/8" to 1/2", forming a rigid positive mold 10 illustrated in FIG. 8, which will subsequently be used in a mold press.

After the copper backing has reached the desired thickness, the copper replica 8 is stripped from the positive mold 10 by administering a mechanical shock force by means, not shown, to the positive mold so that the copper replica is separated from the positive mold at the first chrome-copper interface leaving the positive chrome surfaced copper mold. The chrome surface provides a chemically stable, scratch-resistant surface which will not oxidize with age when heated. The mold 10 is then machined to size and used as a conventional mold in a press to form the desired lenses.

By using epoxy molding methods, the time necessary to form a positive metal mold using the techniques described hereinbefore, is substantially lessened. Using this alternative method, a heated tool is used to form a lens array in a thermoplastic block by indenting a lens replica in the block as before. An epoxy copy of the lens array is then made by casting the epoxy in the indented plastic and then electroplating directly on the epoxy copy to form a positive mold. In this manner, all the prior electroplating steps of the preferred method are eliminated. Since a major portion of the time required to make the mold is taken up in the electroplating steps, this alternative method will permit faster mold production. However, the quality of the mold produced by epoxy molding methods as compared to the quality of the mold produced using electroplating techniques, is sufficiently inferior to make the more time consuming methods of mold formation more desirable.

A second alternative method will completely eliminate all the electroplating steps when a clear epoxy or plastic is cast directly in an indented plastic mold. The surface finish and shape of the indentations can be made almost ideal using the plastic indented mold, but the quality of the lens produced by this casting method will not always meet the high tolerances required of a more intricate lens array.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A method of making a fly's eye lens mold comprising the steps of:
   indenting a heated tool in a block of thermoplastic material to form a lens replica in said block;
   cooling said tool in place;
   removing said tool and repeating the procedure in a step and repeat manner to form a desired lens array; and subsequently
   forming a metal replica of said lens array over said formed thermoplastic block, stripping said thermoplastic block from said metal replica, and forming a positive metal mold by deposition of metal over said metal replica and stripping said positive mold from said metal replica.

2. A method of making a fly's eye lens mold comprising the steps of:
   heating a tool and an associated lens replica;
   forcing said heated tool and lens replica into a block of thermoplastic material forming an indentation in the surface thereof corresponding to said lens replica;
   cooling said tool and lens replica in place in said plastic block;
   removing said tool and lens replica and repeating the procedure in a step and repeat manner until a desired cell array is formed therein;
   vapor depositing a layer of chrome over the entire indented surface of said plastic block;
   vapor depositing a first copper layer over said chrome layer;
   plating a second layer of copper on said first copper layer to form a rigid metal replica of said indented array;
   stripping away said plastic from said metal replica leaving said chrome layer exposed;
   selectively etching away said chrome layer;
   applying a release agent in a thin layer over said metal replica;
   metal plating over said release agent to form a positive metal mold;
   stripping away said metal replica from said positive mold;
   machining said mold to size for use in a conventional mold press.

3. A method of making a fly's eye lens mold as described in claim 2 wherein said second copper layer is plated on said first copper layer by immersing said plastic block in an acid-copper bath.

4. A method of making a fly's eye lens mold as described in claim 2 wherein said plastic mold is stripped away from said metal replica by first rough machining to remove the major portion of said plastic and then by dissolving away the remainder of said plastic leaving said metal replica.

5. A method of making a fly's eye lens mold as described in claim 2 wherein said release agent is interlaced chrome-copper which is applied to said metal replica in a thin layer over the surface of the array.

6. A method of making a fly's eye lens mold as described in claim 2 wherein said plating metal is copper which is plated over said release agent by immersing said replica in an acid-copper bath forming a rigid positive metal mold of a desired thickness.

7. A method of making a fly's eye lens mold as described in claim 2 wherein said replica is stripped from said positive mold by applying a mechanical shock force to said positive mold to separate said replica and said mold at the first chrome-copper interface.

8. A method of making a fly's eye lens mold comprising the steps of:
   embedding a heated tool in a block of thermoplastic material to form a lens replica in said block; cooling said tool in place; removing said tool and repeating the procedure in a step and repeat manner to form a desired lens array; casting epoxy over the indented array to form a replica of said array; removing said cast epoxy from said thermoplastic block; metalplating directly over said epoxy cast to form a positive metal mold; stripping away the epoxy cast; and machining said positive metal mold to size for use in a conventional mold press.

References Cited

UNITED STATES PATENTS

| | | | |
|---|---|---|---|
| 2,837,817 | 6/1958 | Kelley | 29—424 |
| 2,858,603 | 11/1958 | Herrmann | 29—424 X |
| 3,012,451 | 12/1961 | Kohler. | |
| 3,135,046 | 6/1964 | Stookey | 29—424 |
| 3,170,342 | 2/1965 | Downie. | |
| 3,267,826 | 8/1966 | Browning. | |
| 3,283,617 | 11/1966 | Kletzker. | |
| 3,288,045 | 11/1966 | Harding | 95—18 |
| 3,302,439 | 2/1967 | Chattin | 72—342 |
| 3,340,714 | 9/1967 | Pohl | 72—342 |
| 3,384,957 | 5/1968 | Shannon | 29—424 X |

OTHER REFERENCES

Harding: "Fly's-Eye Lens Technique for Generating Semiconductor Device Fabrication Masks," IBM Journal, April 1963, pp. 146–150 (esp. FIG. 4, p. 148).

WAYNE A MORSE, JR., Primary Examiner

U.S. Cl. X.R.

29—460, 472.5, 529; 72—342; 76—107; 95—18